United States Patent
Tikotzenski

(10) Patent No.: US 10,828,972 B2
(45) Date of Patent: Nov. 10, 2020

(54) SYSTEM FOR BONDING A WINDSHIELD TO A WINDSHIELD FRAME

(71) Applicant: PLASAN RE'EM LTD., Ramat Dalton (IL)

(72) Inventor: Leor Tikotzenski, Upper Galilee (IL)

(73) Assignee: PLASAN RE'EM LTD., Ramat Dalton (IL)

( * ) Notice: Subject to any disclaimer, the term of this patent is extended or adjusted under 35 U.S.C. 154(b) by 0 days.

(21) Appl. No.: 16/607,369

(22) PCT Filed: Jan. 31, 2018

(86) PCT No.: PCT/IL2018/050105
§ 371 (c)(1),
(2) Date: Oct. 23, 2019

(87) PCT Pub. No.: WO2018/198106
PCT Pub. Date: Nov. 1, 2018

(65) Prior Publication Data
US 2020/0139800 A1    May 7, 2020

Related U.S. Application Data

(60) Provisional application No. 62/488,770, filed on Apr. 23, 2017.

(51) Int. Cl.
*B60J 10/70* (2016.01)
*B62J 17/04* (2006.01)
(Continued)

(52) U.S. Cl.
CPC .............. *B60J 10/70* (2016.02); *B62J 17/04* (2013.01); *F16J 15/02* (2013.01); *B32B 7/06* (2013.01);
(Continued)

(58) Field of Classification Search
CPC ...... B32B 2307/748; B32B 7/06; B60J 10/72; B60J 10/244; E05B 63/0052; E05B 47/0009
See application file for complete search history.

(56) References Cited

U.S. PATENT DOCUMENTS

| 4,424,865 A | 1/1984 | Payton, Jr. |
| 6,702,301 B1 | 3/2004 | Davies et al. |
| (Continued) | | |

FOREIGN PATENT DOCUMENTS

EP    2302230    3/2011

OTHER PUBLICATIONS

PCT International Search Report and Written Opinion dated Jun. 5, 2018 for PCT/IL2018/050105 filed on Jan. 31, 2018.
(Continued)

*Primary Examiner* — Scott W Dodds
(74) *Attorney, Agent, or Firm* — A.C. Entis-IP Ltd.; Allan C. Entis

(57) ABSTRACT

A system for bonding a windshield to a windshield frame, the system comprising: at least one layer of bonding material that bonds the windshield to the windshield frame; at least one heating element embedded in the bonding material; at least one shape memory element formed from a shape memory material embedded in the at least one layer of bonding material in close proximity to the at least one heating element; at least one electrical power source coupled to the at least one heating element; and a controller operable to control the at least one electrical power source to generate current in the at least one heating element to generate heat that softens and weakens the bonding material and causes the at least one shape memory element to transition to a remembered shape that operates to disrupt the bonding layer and free the windshield from the windshield frame.

15 Claims, 9 Drawing Sheets

(51) Int. Cl.
*F16J 15/02* (2006.01)
*B32B 7/06* (2019.01)

(52) U.S. Cl.
CPC ..... *B32B 2307/748* (2013.01); *C08L 2201/12* (2013.01)

(56) References Cited

U.S. PATENT DOCUMENTS

| | | | | |
|---|---|---|---|---|
| 6,773,535 | B1* | 8/2004 | Wetzel | B29C 65/76 156/247 |
| 2005/0172462 | A1 | 8/2005 | Rudduck et al. | |
| 2005/0230925 | A1 | 10/2005 | Browne et al. | |
| 2006/0201149 | A1* | 9/2006 | Biggs | H01H 1/0036 60/527 |
| 2007/0071575 | A1 | 3/2007 | Rudduck et al. | |
| 2013/0233842 | A1 | 9/2013 | Pys | |
| 2015/0086791 | A1* | 3/2015 | Browne | B32B 7/12 428/414 |
| 2015/0344755 | A1* | 12/2015 | Schneider | B32B 15/08 428/164 |
| 2015/0359043 | A1* | 12/2015 | Kim | C09J 9/02 156/272.2 |

OTHER PUBLICATIONS

PCT International Preliminary Report on Patentability dated Mar. 25, 2019 for PCT/IL2018/050105 filed on Jan. 31, 2018.
European Office Action dated Mar. 27, 2020 for Application No. 18790642.5 filed Nov. 21, 2019.

* cited by examiner

SYSTEM FOR BONDING A WINDSHIELD TO A WINDSHIELD FRAME

RELATED APPLICATIONS

The present application is a U.S. National Phase of PCT Application No. PCT/IL2018/050105 filed on Jan. 31, 2018 which claims benefit under 35 U.S.C. 119(e) of U.S. Provisional Application 62/488,770, filed Apr. 23, 2017, the disclosures of which are incorporated herein by reference.

FIELD

Embodiments of the invention relate to disengaging a windshield from a frame of an armored vehicle.

BACKGROUND

Armored vehicles, are designed and constructed of armored plating to withstand impact of various weapons during combat and to protect a crew operating the vehicle. The use of armored vehicles has long been found outside of professional military forces and are commonly in use for example by civilian police and security forces, various emergency services, escort services, and secure transportation services. Today, it is common to find civilian vehicles heavily armored for protection against acts of tenor, hijacking and robbery. Armored windows also conventionally referred to as "bulletproof glass" or "transparent armor", constitute a portion of an armored vehicle's armor plating. An armored window is typically constructed of different layers of transparent materials, such as glass and plastic composites having various degrees of elasticity, to form a transparent armored window having high resistance to penetration. Armored windows are thicker and heavier than windows commonly used as windshields in ordinary vehicles and are bonded to a windshield frame of an armored vehicle using a strong layer of adhesive to hold the windshield securely in place. In addition, latches or clips may be used to grab and hold the windshield seated in the windshield frame. When service or repair of an armored windshield is required the windshield is removed from its frame by breaking up and/or otherwise damaging the adhesive using scoring and/or cutting tools and forcefully pulling and/or pushing the windshield out from the frame. Removing the windshield is typically an arduous and time consuming task that may result in damage to the removed windshield and its frame.

SUMMARY

An aspect of an embodiment of the disclosure relates to providing a system, hereinafter also referred to as "popwire system" ("POPSY" or "POPSY system"), for bonding a windshield to a windshield frame of a vehicle that provides for relatively easy removal of the windshield from the windshield frame. Optionally, the windshield is an armored windshield seated in a windshield frame of an armored vehicle.

In accordance with an embodiment of the disclosure, POPSY comprises at least one layer of bonding material configured to bond the windshield to the windshield frame, and embedded in the at least one layer a heating element and at least one shape memory wire and/or ribbon, hereinafter also referred to generically as a "popwire", formed from a shape memory alloy (SMA) or polymer, hereinafter, generically a SMA material", in close proximity to the heating element. In an embodiment the at least one popwire comprises a plurality of popwires, each comprising a segment of an SMA material shaped as a wire or ribbon. To remove the windshield from the windshield frame, the heating element is heated to heat the bonding material and the at least one popwire so that the bonding material softens and weakens and the popwire transitions from a martensite phase to an austenite phase. In transitioning to the austenite phase the popwire recovers a remembered shape that generates force that operates to disrupt the at least one layer of adhesive and push the windshield out of the windshield frame.

In an embodiment of the disclosure, POPSY may comprise a controller configured to control and monitor the at least one heating element and maintain temperatures to which it may heat the bonding material and at least one popwire below a temperature at which the bonding material may ignite.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 1:
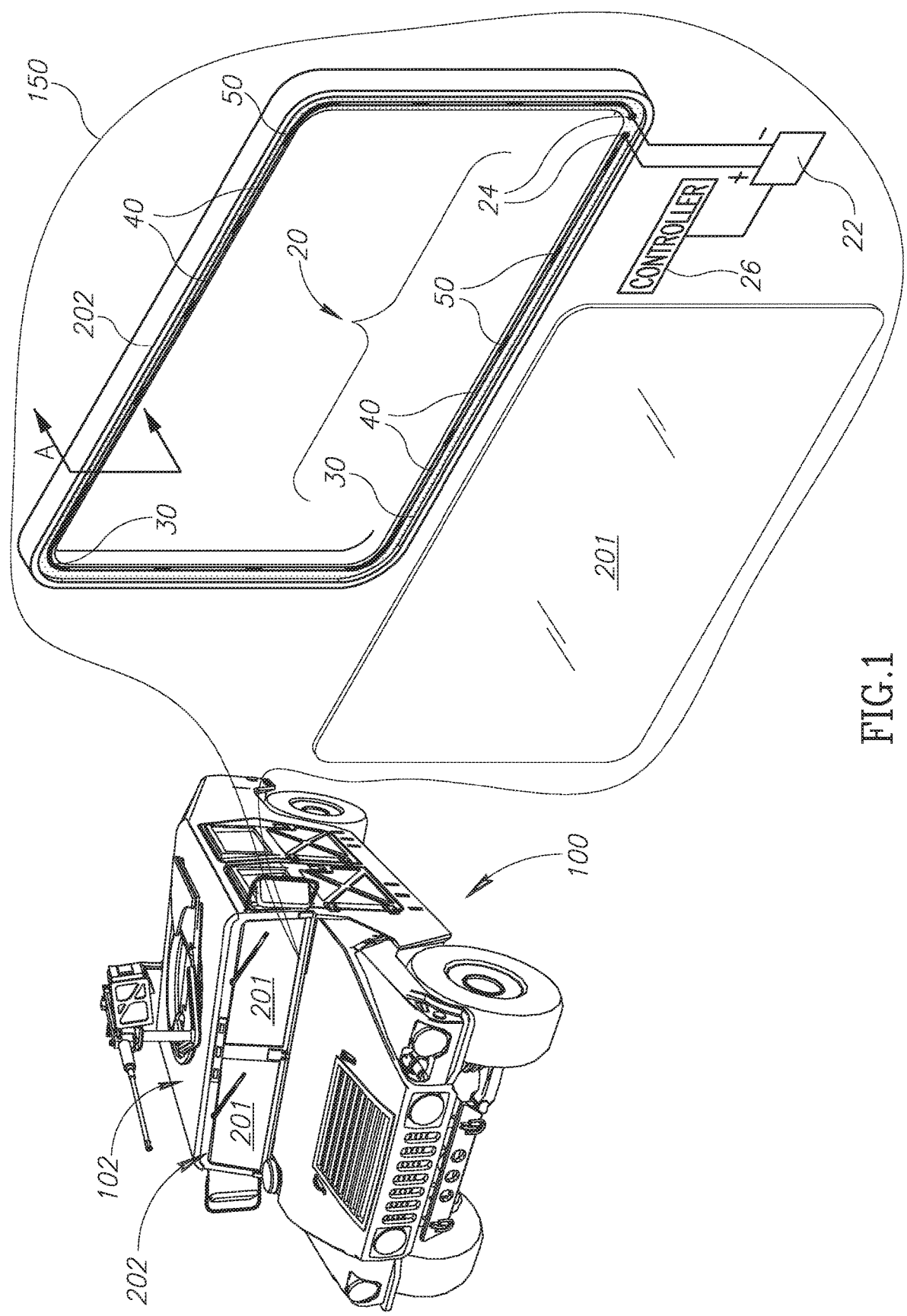
FIG. 1 schematically shows a perspective view of an armored vehicle comprising a POPSY, system in accordance with an embodiment of the disclosure.
Figure 2A:
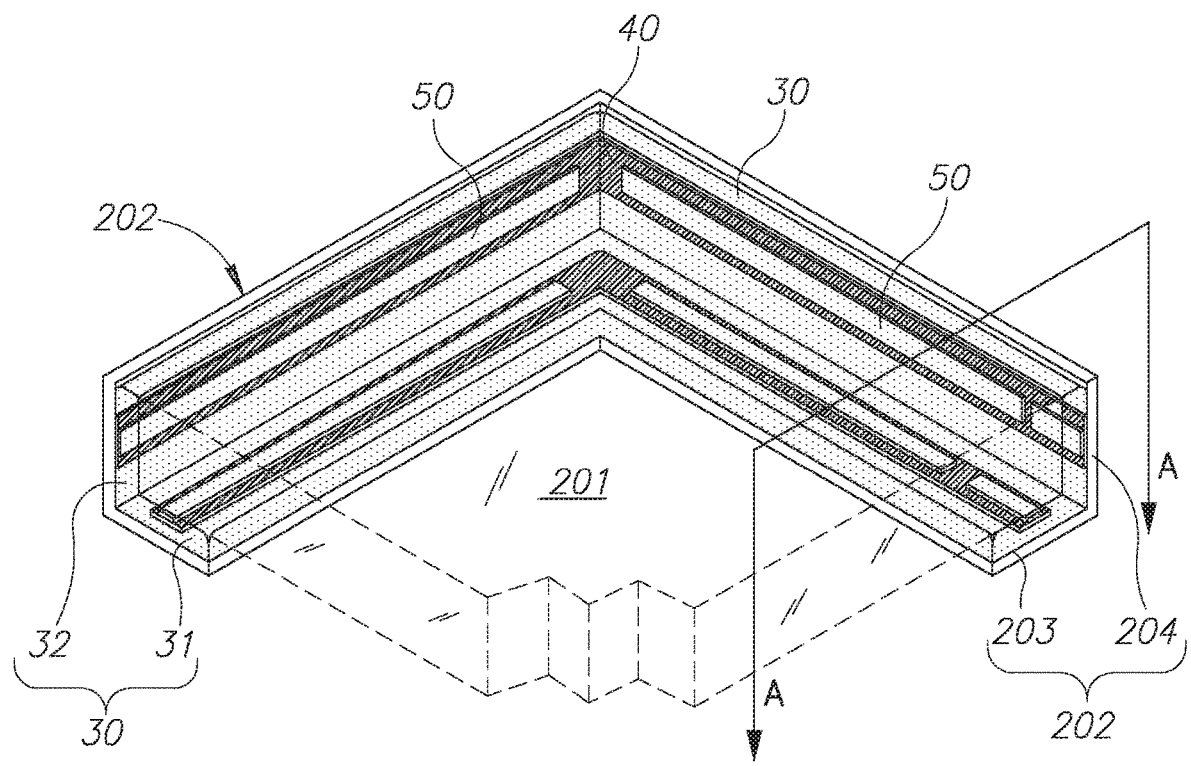
FIG. 2A schematically shows perspective cross-sections of a corner portion of the windshield and POPSY system shown in FIG. 1 in accordance with an embodiment of the disclosure.
Figure 2B:
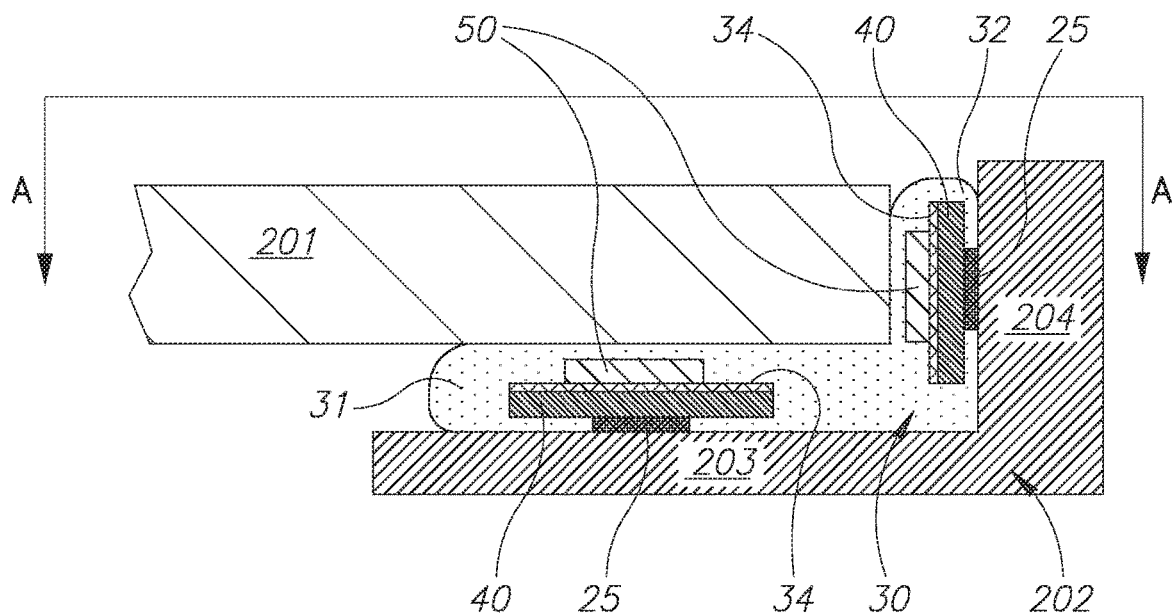
FIG. 2B schematically shows an enlarged cross section of the windshield and POPSY system shown in FIG. 1 in accordance with an embodiment of the disclosure.
Figure 5:
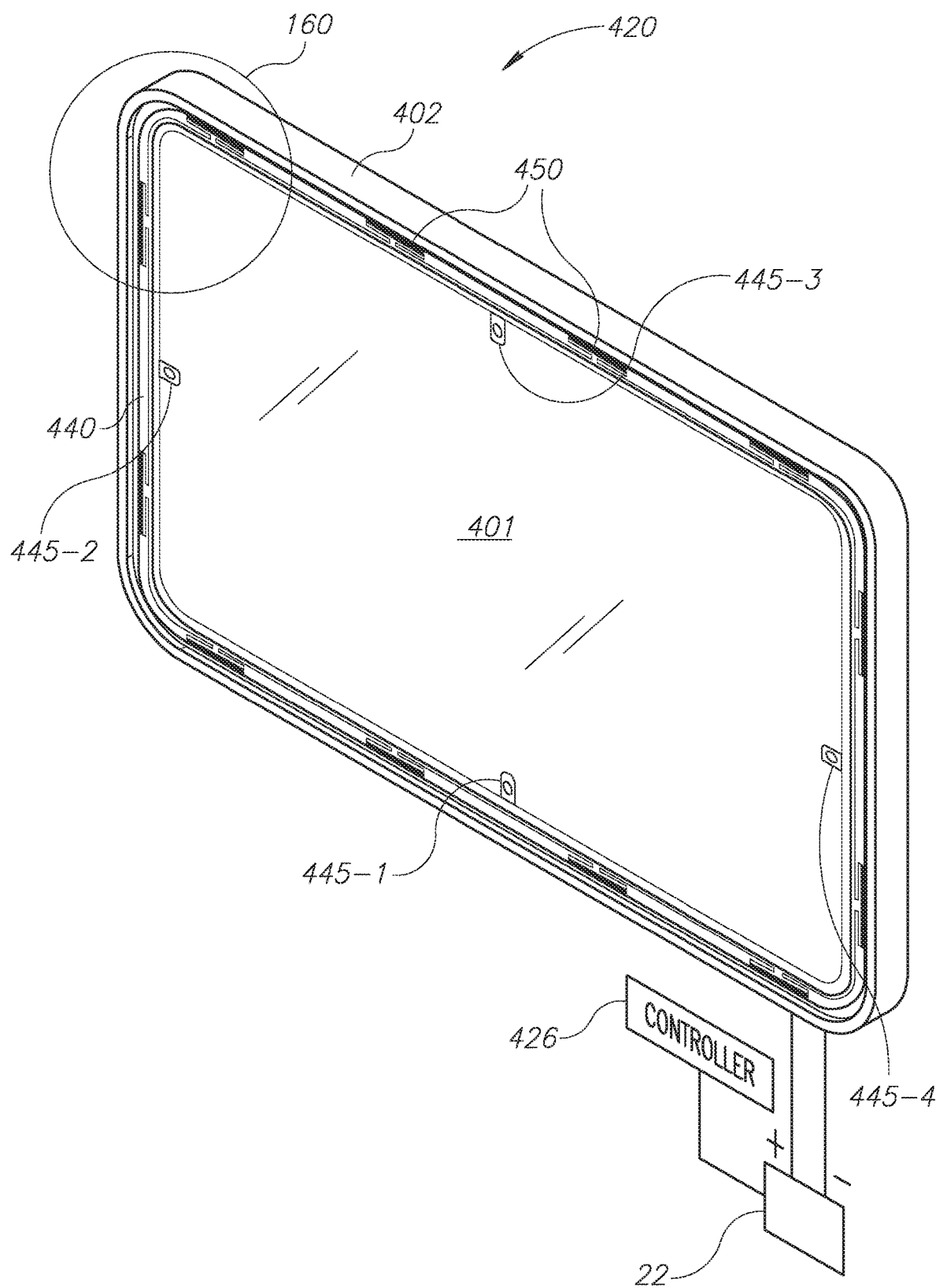
FIG. 5 schematically shows a perspective view of a windshield and a windshield frame of another configuration of a POPSY system, in accordance with an embodiment of the disclosure.
Figure 6A:
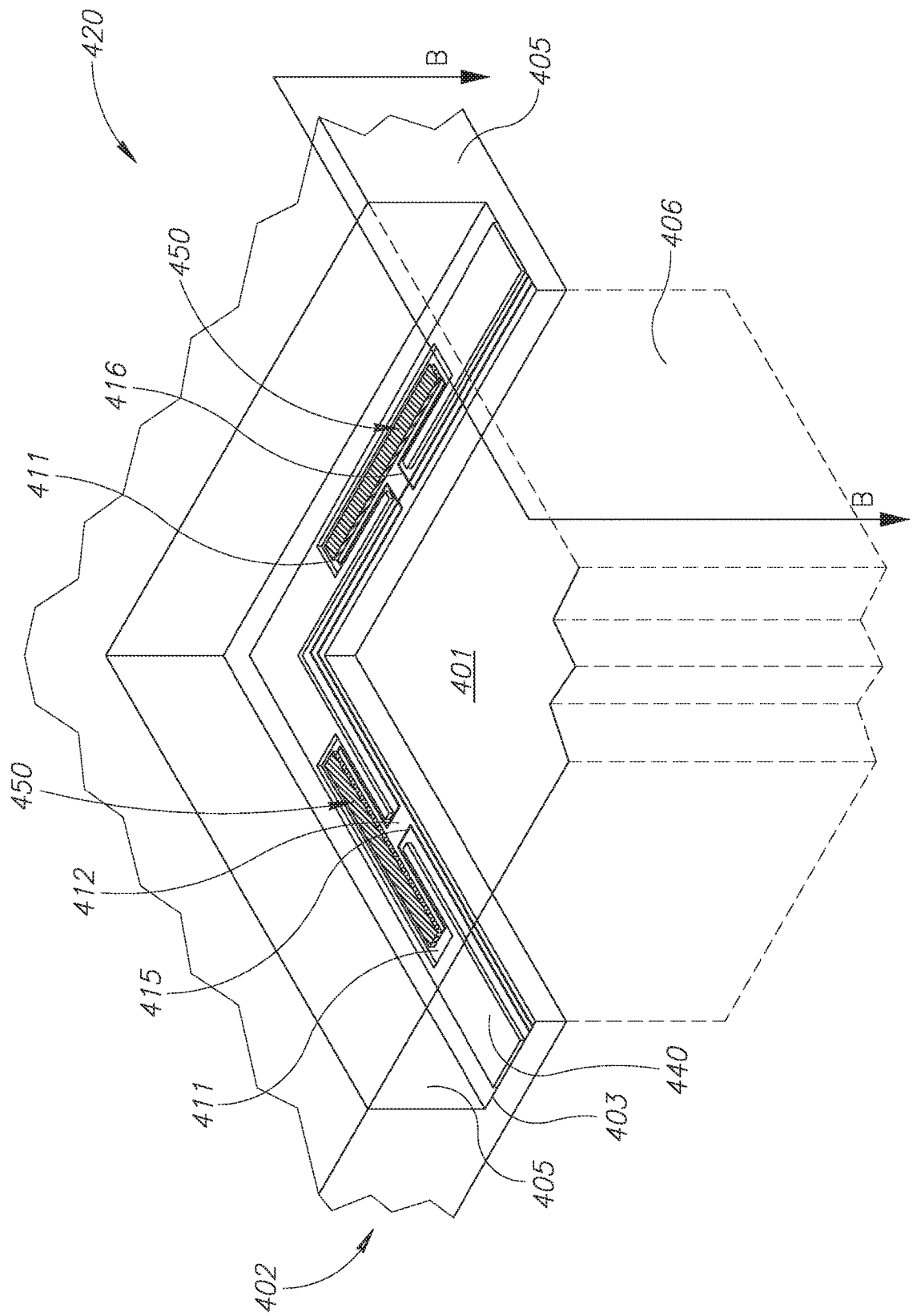
FIG. 6A schematically shows perspective cross-sections of a corner portion of the windshield and POPSY system shown in FIG. 5, in accordance with an embodiment of the disclosure.
Figure 6B:
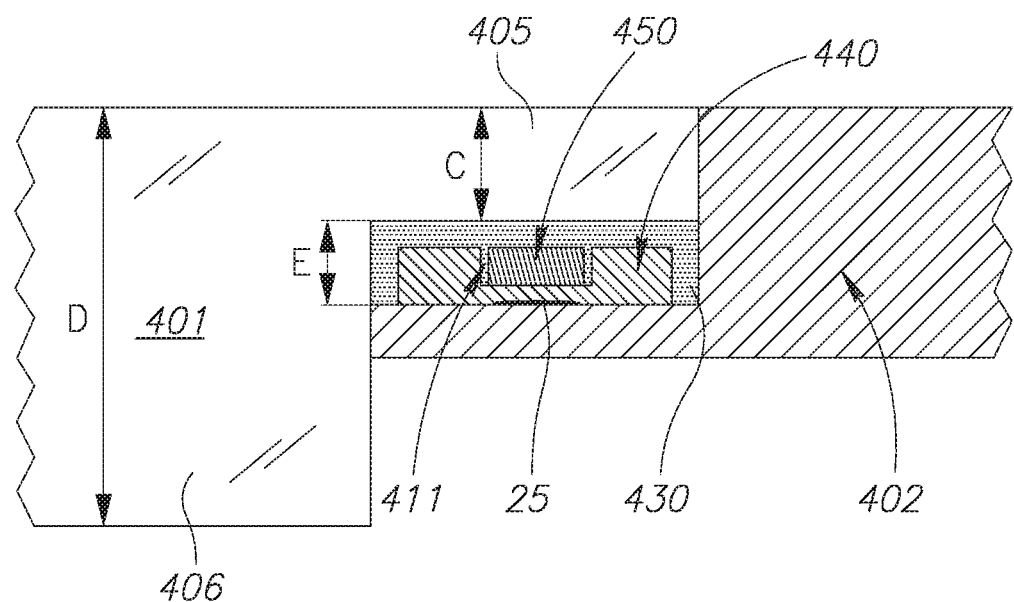
FIG. 6B schematically shows an enlarged cross section of the windshield and POPSY system shown in FIG. 6A in accordance with an embodiment of the disclosure.

In the following detailed description, an overview of a POPSY system installed in an armored vehicle to seal an armored windshield to a windshield frame in the vehicle is discussed with reference to FIG. 1. Details of components of the POPSY shown in FIG. 1 are discussed with reference to FIGS. 2A and 2B which show cross-section views of portions of the windshield and windshield frame shown in FIG. 1. In FIGS. 1-2B SMA popwires in the POPSY system are shown in a martensite phase, also referred to as a passive state, in which the popwires do not exert force to disassemble the windshield from its windshield frame. A method of installing a POPSY system in accordance with an embodiment of the disclosure is discussed with reference to a flow diagram shown in FIG. 3. Transition of the popwires from the martensite phase shown in FIGS. 2A and 2B to an austenite phase in which the popwires change shape to exert force that pushes the windshield out of its windshield frame is discussed with reference to FIGS. 4A and 4B which show the popwires in an austenite phase. Another configuration of a POPSY system installed in an armored vehicle to seal an armored windshield to a windshield frame of the vehicle in accordance with an embodiment are discussed with reference to FIG. 5. Details of features of the POPSY system shown in FIG. 5 are shown in FIGS. 6A and 6B and discussed with reference to the figures. Disengagement of the windshield from the windshield is discussed with reference to FIGS. 7A and 7B.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

FIG. 1 schematically shows a perspective view of an armored vehicle 100, comprising an armored windshield 201 that is bonded to a windshield frame 202 using a POPSY system 20 in accordance with an embodiment of the disclosure. Windshield 201 and windshield frame 202 are shown enlarged in a partially exploded perspective view in an inset 150 to schematically show elements of POPSY 20 in accordance with an embodiment. POPSY 20 may comprise at least one layer of a bonding material indicated by a textured region 30 having embedded therein at least one heating element 40. Optionally, at least one SMA popwire 50 overlies each of the at least one heating element. A power source 22 controlled by a controller 26 configured to provide power to at least one heating element 40 is connected to the heating element at electrical connection junctions, or lands 24. Components of POPSY 20 and their relationships to windshield 201 and windshield frame 202 are shown enlarged in FIGS. 2A and 2B. FIG. 2A schematically shows a perspective cross-section in a plane indicated by a cross section icon A-A in FIG. 1 of windshield 201, windshield frame 202, and components of POPSY 20 in accordance with an embodiment. FIG. 2B schematically shows an enlargement of the cross-section in plane A-A indicated in FIG. 1 and FIG. 2A. As shown in FIGS. 2A and 2B windshield frame 202 has an L shaped cross-section profile having a bottom flange 203 and an edge flange 204.

As schematically shown in FIGS. 2A and 2B, at least one heating element 40 is embedded in the at least one layer of bonding material 30, and a plurality of SMA popwires 50 overlies the at least one heating element. Optionally, at least one bonding layer of bonding material 30 may comprise a portion 31 (FIGS. 2A, 2B) that adheres to bottom flange 203 and a portion 32 (FIGS. 2A, 2B) that adheres to edge flange 204. At least one heating element 40 may comprise a heating element 40 embedded in portion 31 and a heating element 40 embedded in portion 32 of bonding material 30. In an embodiment, each heating element 40 is thermally coupled to at least one temperature sensor 25 (FIG. 2B) configured to provide measurements of temperature of the heating element to which it is thermally coupled, and controller 22 controls current to heating elements 40 based on temperature measurements that the sensors provide. Popwires 50 may be formed having any of various martensite and austenite phase shapes from a suitable SMA alloy such as a nickel-titanium alloy conventionally referred to as nitinol, or a SMA polymer and may be formed in different shapes. For example, the popwires may be ribbon shaped or wire shaped. In FIGS. 1-4B popwires are assumed to be ribbon shaped and each popwire is bonded to the heating element 40 that it overlies by a thermally conducting epoxy layer 34 (FIG. 2B).

In accordance with an embodiment of the disclosure to remove windshield 201 from windshield frame 202, controller 26 controls power source 22 to generate current in heating element 40 to heat at least one layer 30 of bonding material to soften and weaken the bonding material and to heat popwires 50 so that they transition from a martensite phase to an austenite phase. In the austenite phase popwires 50 distort to assume a remembered shape that operates to generate force that disrupts at least one bonding layer 30 and forces windshield 201 out of windshield frame 202. In FIGS. 1-4B, popwires 50 are assumed in the martensite phase to have a flat ribbon shape. In transition to the austenite phase the SMA ribbon shape may, by way of example, morph to assume a wave shape displaced perpendicular to the plane of the ribbon over which it lies as shown in FIGS. 4A and 4B and discussed below.

By way of a numerical example, armored windshield 201 may be about 70 mm (millimeter) thick and at least one bonding layer 30 may be between about 3-5 mm thick and comprise any bonding material suitable for bonding an armored glass windshield to a material from which windshield frame 202 is formed. Typically, windshield frame 202 is formed from a steel, and the bonding material may be a polyurethane adhesive such as Sikaflex®-265. Ribbon shaped SMA popwires 50 may be formed from nitinol and have thickness equal to about 1 mm to about 2 mm, width 10 mm and length about 100 mm. Heating elements 40 embedded in bonding portions 31 and 32 of at least one bonding layer 30 may be continuous ribbons lying substantially along the full lengths of flange 203 and 204 respectively. Heating elements 40 may have thickness between about 0.5 mm and about 2 mm, widths between about 10 and 40 mm, and be formed from be stainless steel such as 303 or 304 stainless steel. Epoxy layers 34 (FIG. 2B) may be formed from a thermally conducting epoxy such as DP-100 and have thickness between about 0.3 to about 1 mm.

Figure 3:
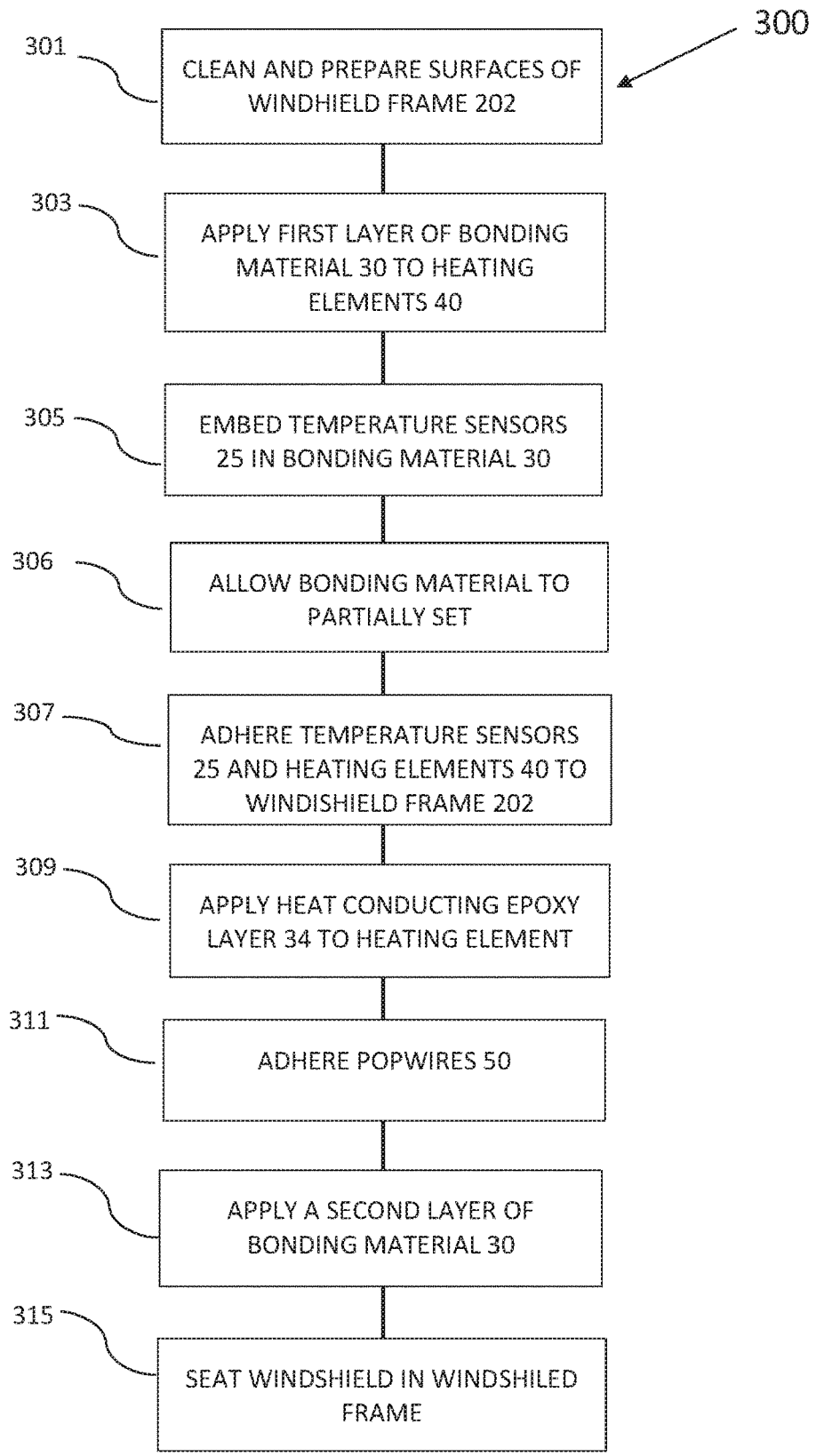
FIG. 3 shows a flow diagram depicting steps in installing a POPSY in an armored vehicle, in accordance with an embodiment of the disclosure.

FIG. 3 shows a flow diagram 300 of a procedure by which POPSY 20 may be assembled to bond an armored windshield to a windshield frame of an armored vehicle, such as vehicle 100, in accordance with an embodiment of the disclosure. In a block 301 surfaces of windshield frame 202 are cleaned and prepared for receiving bonding material 30. In a block 303, a first layer of bonding material 30 is applied to heating elements 40. In a box 305 at least one temperature sensor 25 is embedded in the first layer of bonding material 30 so that heating element 40 contacts the at least one temperature sensor 25. In a block 306 the first layer of bonding material 30 is left to set for about 12 hours to allow the bonding material to partially harden yet remain tacky, optionally prior to adhering the heating elements and the at least one temperature sensor to surfaces of the windshield frame. In a block 307 heating elements 40 and at least one temperature sensor 25 are adhered to inner surfaces of bottom and side flanges 203 and 204. As schematically shown in FIG. 2A, at least one temperature sensor 25 is optionally adjacent bottom flange 203 and adjacent side flange 204 and heating elements 40 are located over the temperature sensors. Alternatively, at least one heating element 40 may be adhered to the bottom or side flange 203 and 204 and at least one temperature sensor 25 located over the heating element. In a block 309 epoxy layer 34 is applied to each heating element 40 and in a block 311 SMA popwires 50 are pressed to and bonded to the epoxy layer. In a block 313, a second layer of bonding material 30 is applied to, optionally, substantially encapsulate the first layer of bonding material 30, heating elements 40 and popwires 50 and provide a thickness of bonding material 30 between about 1 mm and about 3 mm overlying the popwires. The second layer of bonding material 30 may be formed from a same or different bonding material as the first bonding material layer. In a block 315 armored windshield 201 is seated in windshield frame 202 to bond to the second layer of bonding material 30. In accordance with an embodiment of the disclosure, portions 31 and 32 of bonding material 30 may cover a substantial portion of bottom and edge flanges 203 and 204 respectively, to provide relatively sufficient bonding of the windshield to the windshield frame.

Figure 4A:
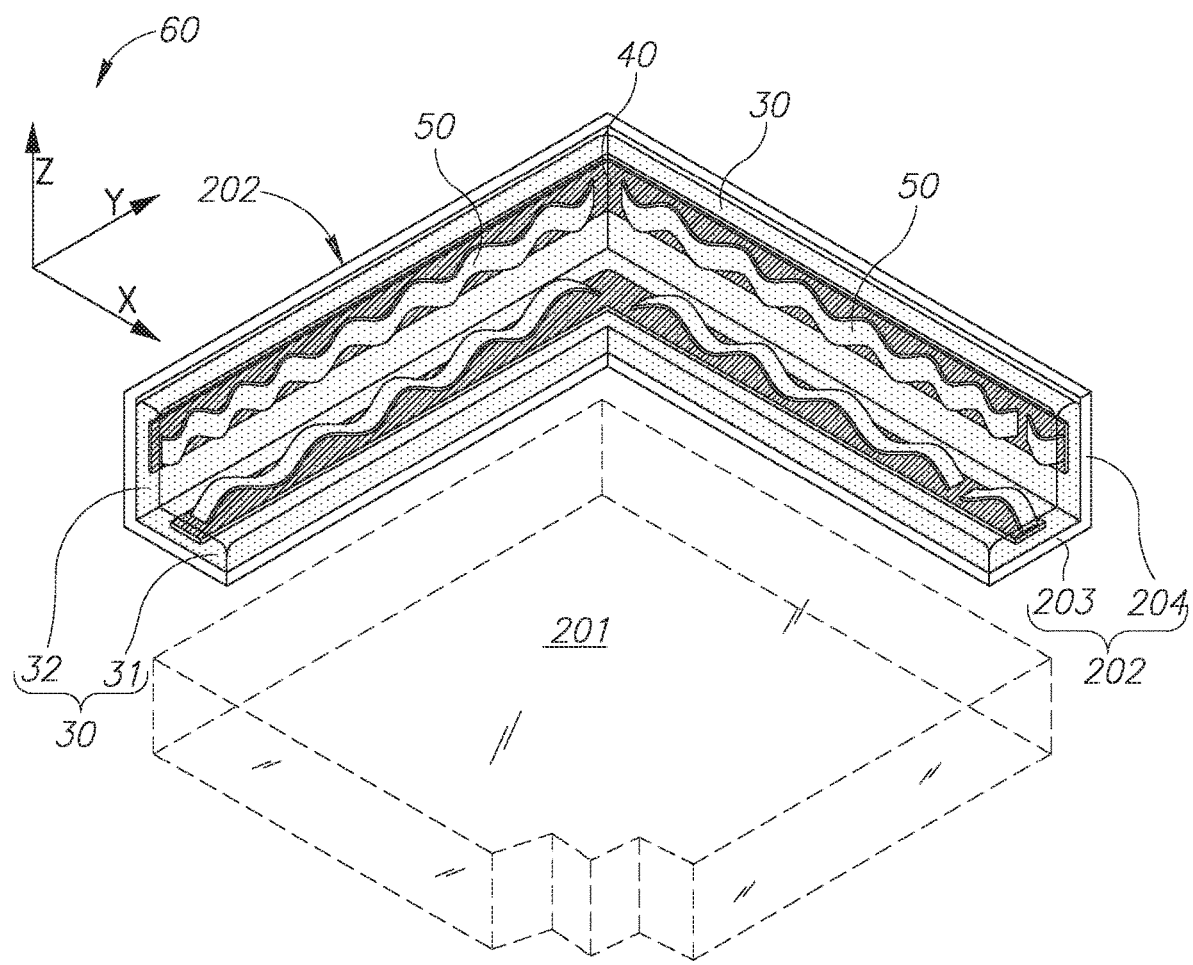
FIG. 4A schematically shows perspective cross-sections of a corner portion of the windshield and POPSY system shown in FIG. 1 when POPSY has been activated to push the windshield out of the windshield frame and SMA popwires in POPSY have transitioned from a martensite to an austenite phase in accordance with an embodiment of the disclosure.
Figure 4B:
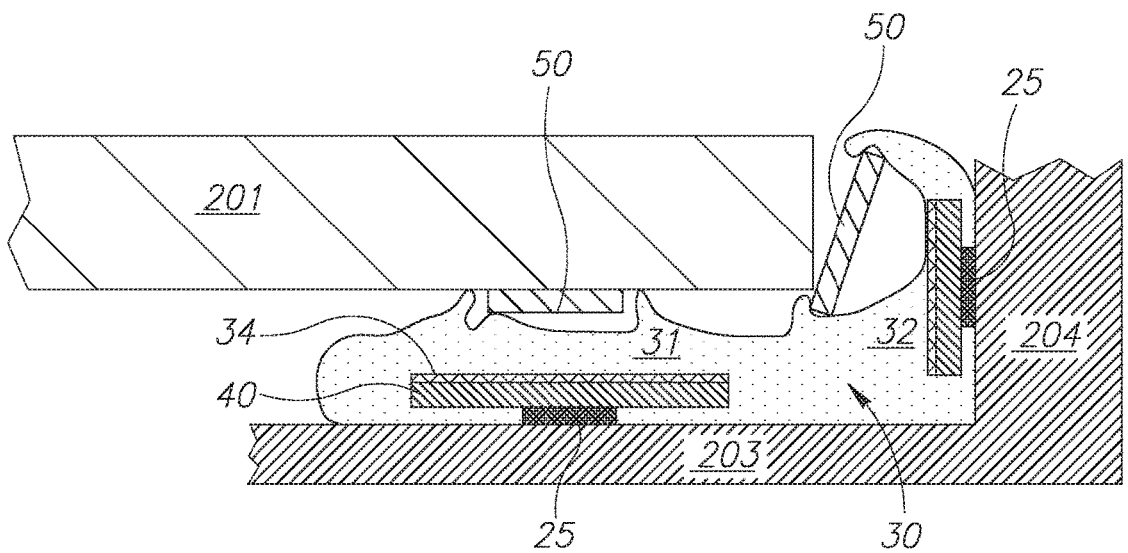
FIG. 4B schematically shows an enlarged cross section of the windshield and activated POPSY system shown in FIG. 4A in accordance with an embodiment of the disclosure.

It is noted, that whereas FIGS. 2A and 2B, as well as FIGS. 4A and 4B show that the adhesive layer that bonds the heating elements to the inside surfaces of the flanges 203 and 204 of windshield frame 202, cover substantially the entire inside surfaces, embodiments of the disclosure are not limited to an adhesive that covers the entire inside surfaces of the windshield frame, and the adhesive may have various dimensions. By way of example, the adhesive applied to bond the heating element with the surface of the frame may have a width and length substantially congruent with the width and length of a heating element. In an embodiment of the disclosure and after the windshield is bonded to the frame as described in flow diagram 300 bonding portions 31 and 32 may each have a total cross section thickness of about 5 mm. In an embodiment, heating element 40 are embedded within the bonding material at substantially half way from the surface of the windshield frame to the windshield.

FIG. 4A schematically, shows perspective cutaway exploded view of a corner of windshield 201 and portions of POPSY 20, after controller 26 has activated POPSY 20 to push the windshield out of windshield frame 202. FIG. 4A shows a coordinate system 60 having x, y and z axes for convenience of referencing positions and orientations of features in the figure. FIG. 4B shows a cross section of windshield 201, frame 202 and portions of POPSY 20 after controller 26 has activated POPSY 20 to push the windshield out of windshield frame 202.

In activating POPSY 20, controller 26 controls power source 22 to drive current through heating elements 40 to heat the elements and thereby to heat and weaken bonding layer 30 and heat popwires 50 so that they transition to their respective austenite phases. In the austenite phases popwires assume remembered shapes that operate to break up binding layer 30 and push windshield 201 out of windshield frame 202. In transitioning to the austenite phase, portions of popwires 50 embedded in bonding portion 31 along flange 203 optionally displace substantially perpendicular to bottom flange 203 in a direction of the z axis (FIG. 4A) of coordinate system 60 to assume a remembered wavy shape. In transitioning to the austenite phase, portions of popwires 50 embedded in bonding portion 32 along flange 204 optionally displace along the −y-axis of coordinate system 60. FIG. 4B schematically shows popwires 50 after they have assumed their austenite shapes disrupted bonding portions 31 and 32 of at least one bonding layer 30 and operated to displace windshield 201 out of windshield frame 202.

It is noted that when heating heating elements 40, controller 26 receives signals from temperature sensors 25 that provide measurements of temperature of the heating elements. The controller operates to control current that power source 22 generates in the heating elements so that temperature of at least one bonding layer 30 and popwires 50 remain within advantageous temperature ranges and do not ignite. It is also noted that whereas popwires 50 are described as having wavy austenite shapes, practice of embodiments of the disclosure is not limited to wavy shapes, or wavy shapes of the type described. For example, in an embodiment a popwire may transition to a corkscrew shape or simply elongate or contract to assume a lengthened or shortened shape.

Figure 7A:
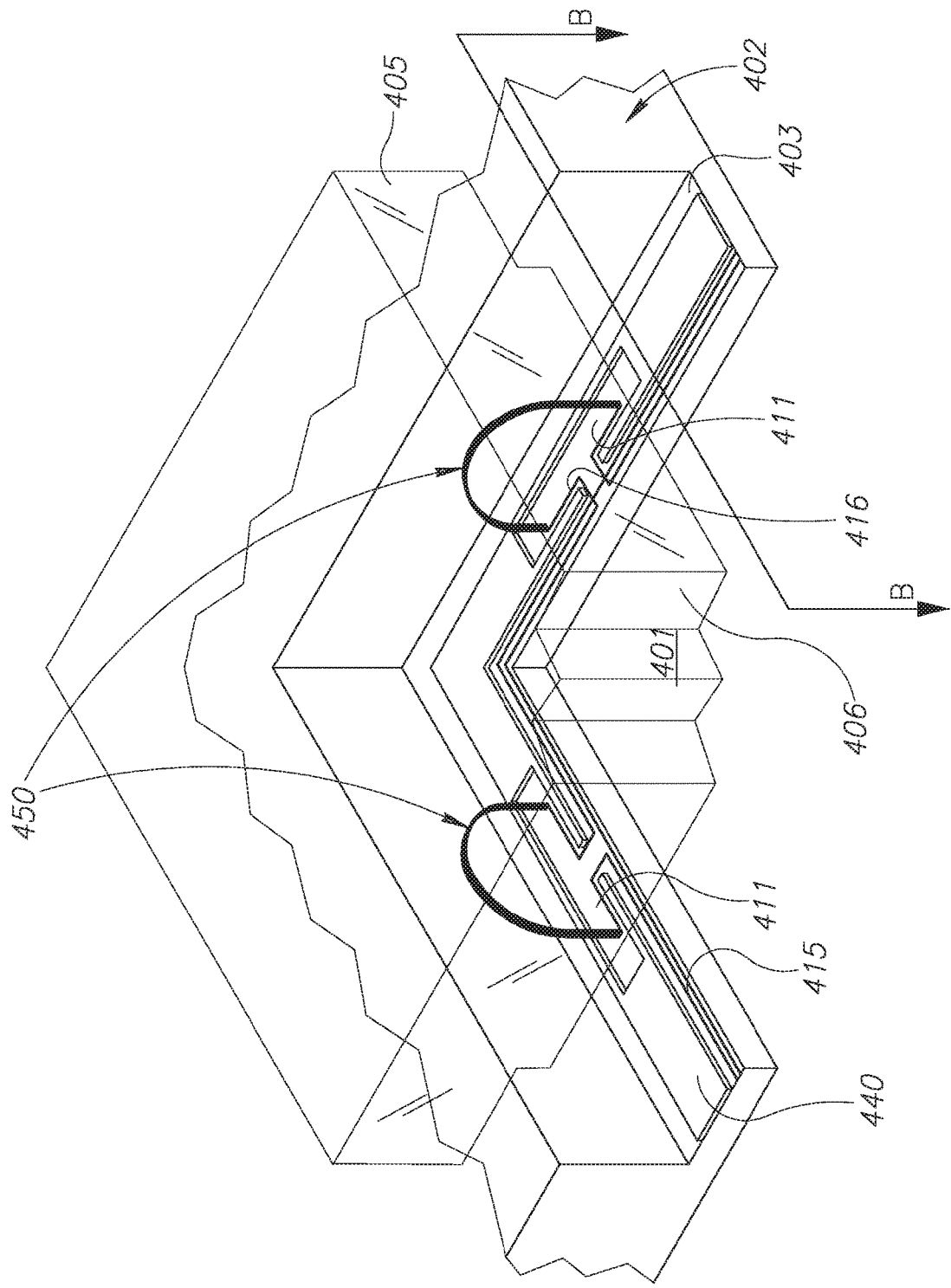
FIG. 7A schematically shows a perspective cross-section of a corner portion of the windshield and POPSY system shown in FIG. 6A when POPSY has been activated.
Figure 7B:
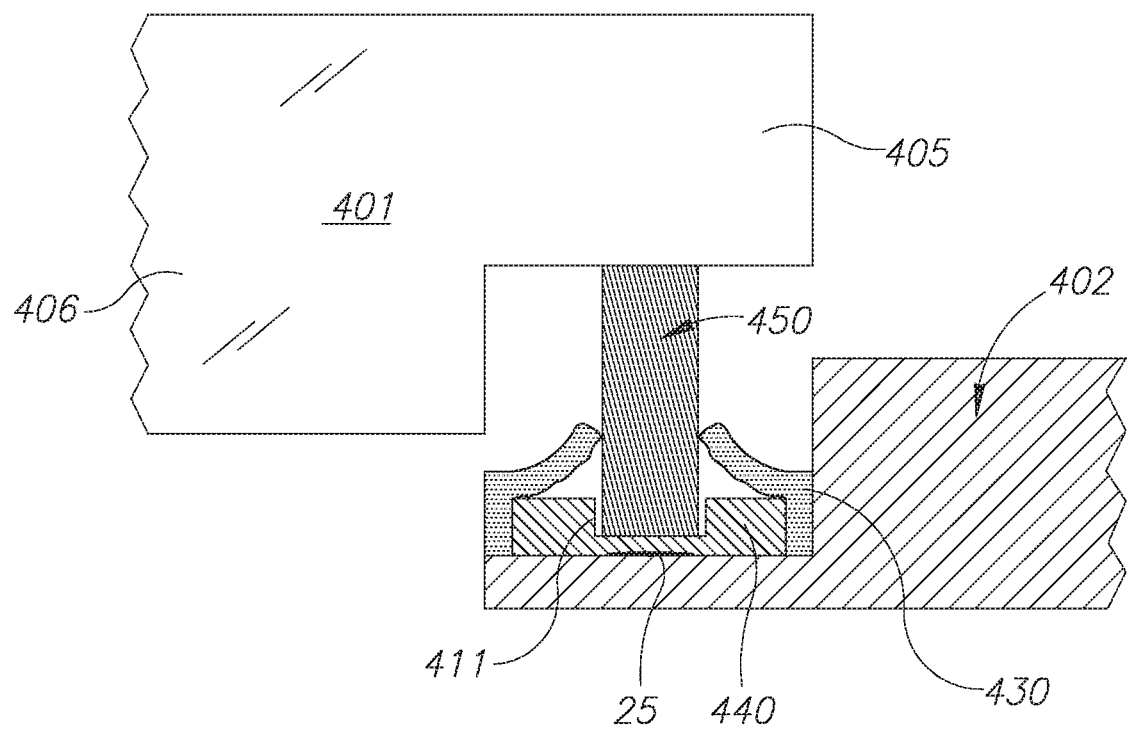
FIG. 7B schematically shows an enlarged cross section of the windshield and activated POPSY system shown in FIG. 7A in accordance with an embodiment of the disclosure.

FIGS. 5, 6A, 6B, 7A, 7B schematically show features and operation of another POPSY system 420 installed in an armored vehicle, such as armored vehicle 100 in FIG. 1, bonding an armored windshield 401 to a windshield frame 402, in accordance with an embodiment of the disclosure. FIG. 5 shows a zoom out view of windshield 401, windshield frame 402, and POPSY 420. FIG. 6A shows components of POPSY 420 enlarged in a cutaway, perspective view of a corner of windshield 401 and windshield frame 402 within a circle 160 shown in FIG. 5. FIG. 6B schematically shows an enlarged cross-section view of the windshield bonded to the windshield frame 402 in a plane B-B indicated in FIG. 6A. By way of example, as shown in FIGS. 6A-7B armored windshield 401 may be formed having a relatively thick body 406 having thickness "D" (FIG. 6B), and a relatively thin lip 405 having thickness "C" (FIG. 6B) surrounding the body that is bonded to frame 402 by a layer of bonding material 430 having thickness "E" (FIG. 6B). Thickness of body 406 may be determined based on required impact resistance. Thickness of lip 405 may be determined so that armored windshield 401 seats substantially flush with windshield frame 401 when bonded to the frame by the layer of bonding material 430 (FIG. 6B, 7B).

In an embodiment, as shown in FIG. 5, POPSY 420 optionally comprises a single heating element 440 seated on and running substantially the complete length of a bottom flange 403 of the windshield frame. Heating element 440 is formed having a plurality of recesses 411 in each of which a popwire 450 is seated. At least one power supply 22 controlled by a controller 426 optionally powers heating element 440 and popwires 450. In an embodiment, power supply 22 is connected to heating element 440 at a plurality of, optionally four, electrical connection junctions or lands 445-1, 445-2, 445-3, and 445-4, generically referred to as lands 445. Power supply 22 may be connected to heating element 440 so that each segment of the heating element between two lands 445 that are adjacent to each other along the heating element is electrically connected to the power supply in parallel to the other segments. As a result, if electrical continuity of a segment of heating element 440 between two adjacent lands 445 is broken, the heating element can continue to receive power and be heated by power supply 22. For example in POPSY 420 lands 445-1 and 445-3 may be connected to a same positive terminal of power supply 22 and lands 445-2 and 445-4 connected to a same negative terminal of power supply 22. Connecting segments of heating element 440 to power supply 22 in parallel provides advantageous redundancy and robustness to operation of POPSY 420. Optionally, temperature in each segment of heating element 440 is sensed by a different thermal sensor 25, schematically shown in FIG. 6B that contacts the segment of the heating element. Controller 426 may control power that at least one power supply 22 provides heating element 440 based on signals that sensors 25 generate responsive to temperatures of segments of heating element 440 which they respectively contact. In an embodiment, controller 426 comprises a proportional-integral-derivative (PID) controller (not shown) that receives and processes the signals from thermal sensors 25 to control power to heating element 440 and maintain a desired temperature of the heating element.

In an embodiment, POPSY 420 provides advantageous operational robustness and redundancy by controlling power to popwires 450 from at least one power supply 22 via different circuits. For example, popwires in a first group of popwires 450 comprised in POPSY 420 may be electrically connected in series to at least one power supply 22 by a first power line 415 shown in FIG. 6A, and popwires in a second group of popwires 450 may be electrically connected in series to at least one power supply 22 by a second power line 416 shown in FIG. 6B. Controller 426 may control power to popwires 450 connected to power line 415 independently of power to popwires 450 connected to second power line 416. In an embodiment, controller 426 comprises first and second PID controllers (not shown). Controller 426 controls current that at least one power supply 22 generates in popwires 450 responsive to signals that the PIDs provide, which measure deviations of currents flowing in first and second power lines 415 and 416 respectively from desired currents.

In an embodiment. controller 426 is configured to pop armored windshield 401 out from windshield frame 402 by controlling at least one power supply 22 to heat heating element 440 and generating current in the first group of popwires 450 prior to generating current in the second group of popwires 450. In an embodiment, the controller controls current to activate the first group of popwires to generate and exert a relatively large force between the windshield 401 and frame 402 that disrupts bonding layer 430. Subsequent to initiating current to popwires 450 in the first group of popwires controller 426 controls current to activate popwires 450 in the second group of popwires to displace armored windshield 401 by a distance sufficient to free the windshield from frame 402. For example, the second group of popwires may be activated to displace windshield 401 by a distance equal to or greater than about D−(E+C).

FIG. 7A schematically shows the perspective cutaway view of the portion of windshield 401, windshield frame 402, and POPSY 420 shown in FIG. 6A following activation of POPSY to pop windshield 401 out from windshield frame 402. As a result of activation, controller 426 controls power supply 22 to heat heating element 440 and drive current through popwires 450 so that bonding material 430 softens and deformation of popwires 450 transitioning to their austenite phase shape ruptures the layer of bonding material 430 and pops windshield 401 out of frame 402. FIG. 7A shows schematic perspective views of popwires 450 in the austenite phase and FIG. 7B schematically shows a cross section in a plane B-B indicated in FIG. 7A of the ruptured layer of bonding material 30 and popped windshield 401.

By way of a numerical example, assume that thicknesses C and D of lip 405 and body 406 of windshield 401 as shown in FIG. 6A are equal to about 6-8 mm and 22 mm and that thickness of bonding material 430 is equal to about 5 mm. If the windshield has an area of about 2.5 $m^2$ the windshield may weigh about 120 kg. Assuming the layer of bonding material is about 5 mm thick and the bonding material is a polyurethane adhesive such as Sikaflex®-265, a force of about 8000 Newtons is required to pop windshield 401 out of frame 402. POPSY 420 may comprise 16 nitinol popwires 450 having dimensions equal to about 100 mm×10 mm×2.2 mm. Optionally, the 16 popwires comprise first and second groups of 8 popwires each. Controller 426 may control at least one power supply 22 to heat bonding layer 430 to about 120° C. and excite the popwires 450 in the first group of popwires to disrupt bonding layer 430 and excite popwires 450 in the second group of to displace windshield 401 by a distance equal to about 10 mm to pop windshield 401 out of frame 402. In an embodiment, exciting popwires 450 in the first group of popwires comprises pulsing the popwires for 1 second with current of about 300 amps and for about ten seconds thereafter pulsing the popwires at a duty cycle of about 30% with current pulses of 300 amps. Optionally, exciting the popwires in the second group of popwires comprises pulsing the popwires for 2 seconds with a current of about 300 amps and for about ten seconds thereafter pulsing the popwires at a duty cycle of about 50% with current pulses of 300 amps. Operating POPSY 420 for the noted numerical specifications noted in this paragraph above may pop armored windshield 401 from frame 402 in about 15 seconds or less.

Whereas the description above has referred to a POPSY system for bonding a windshield with a windshield frame, embodiments of the invention are not limited to windshields and a POPSY system such as POPSY 20 or 420 may be applied for sealing various vehicle apertures such as non-operable side windows and sunroofs and various aperture panels. Optionally POPSY system may be applied to sealing various apertures such as windows or exits of a building.

In the description and claims of the present application, each of the verbs, "comprise" "include" and "have", and conjugates thereof, are used to indicate that the object or objects of the verb are not necessarily a complete listing of components, or parts of the subject or subjects of the verb.

Descriptions of embodiments of the disclosure in the present application are provided by way of example and are not intended to limit the scope of the disclosure. The described embodiments comprise different features, not all of which are required in all embodiments. Some embodiments utilize only some of the features or possible combinations of the features. Variations of embodiments of the disclosure that are described, and embodiments comprising different combinations of features noted in the described embodiments, will occur to persons of the art. The scope of the invention is limited only by the claims.

The invention claimed is:

1. A system for bonding a windshield to a windshield frame, the system comprising:
   at least one layer of bonding material for bonding the windshield to the windshield frame;
   at least one heating element embedded in the bonding material;
   at least one shape memory element formed from a shape memory material embedded in the at least one layer of bonding material in close proximity to the at least one heating element;
   at least one electrical power source coupled to the at least one heating element; and
   a controller operable to control the at least one electrical power source to generate current in the at least one heating element to generate heat that softens and weakens the bonding material and causes the at least one shape memory element to transition to a remembered shape that operates to disrupt the bonding layer and free the windshield from the windshield frame.

2. The system according to claim 1 wherein the windshield frame has a bottom flange on which the windshield seats and an edge flange that borders the windshield, and the at least one layer of bonding material comprises a layer of bonding material formed to bond the windshield to the bottom flange.

3. The system according to claim 2 wherein the at least one shape memory element comprises at least one shape memory element located in the layer of bonding material formed to bond the windshield to bottom flange.

4. The system according to claim 2 wherein the at least one layer of bonding material comprises a layer of bonding material formed to bond the windshield to the edge flange.

5. The system according to claim 3 wherein the at least one shape memory element located in the layer of bonding material formed to bond the windshield to the bottom flange comprises a plurality of shape memory elements.

6. The system according to claim 5 wherein the layer of bonding material formed to bond the windshield to the bottom flange is formed having a recess for each shape memory element of the plurality of shape memory elements in which the shape memory element seats.

7. The system according to claim 5 wherein the plurality of shape memory elements located in the bonding layer formed to bond the windshield to the bottom flange comprises a plurality of groups of shape memory elements, each group electrically connected to the at least one electrical power supply by a different circuit.

8. The system according to claim 7 wherein the controller is configured to control the at least one power supply to generate current in each group of shape memory elements independently of current in another group of the groups of shape memory elements.

9. The system according to claim 8 wherein the controller is configured to control current in shape memory elements in a first group of the plurality of groups of shape memory elements to cause the shape memory elements in a first group to deform and generate relatively large forces that operate to disrupt the bonding layer formed to bond the windshield to the bottom flange.

10. The system according to claim 9 wherein the controller is configured to control current in shape memory elements in a second group of the shape memory elements to cause the shape memory elements in the second group to deform and generate a relatively large displacement of the windshield having a magnitude sufficient to move the windshield out from the frame.

11. The system according to claim 10 wherein the controller is configured to initiate current in the shape memory elements in the first group of shape memory elements prior to initiating current in the shape memory elements in the second group of shape memory elements.

12. The system according to claim 10 wherein the magnitude of the relatively large displacement is sufficient to displace the windshield past the bottom flange.

13. The system according to claim 2 wherein the at least one heating element formed to bond the windshield to the bottom flange comprises a single heating element extending substantially the complete length of the bottom flange.

14. The system according to claim 1 wherein the at least one electrical power source is connected to the heating element at a plurality of lands so that a segment of the heating element between two lands that are adjacent to each other along the heating element is electrically connected to the at least one power supply in parallel to segments of the heating element between other pairs of adjacent lands.

15. The system according to claim 14 wherein the number of lands is equal to or greater than four.

* * * * *